(12) United States Patent
Sinclair et al.

(10) Patent No.: US 7,490,667 B2
(45) Date of Patent: Feb. 17, 2009

(54) PROPPANTS WITH SOLUBLE COMPOSITE COATINGS

(75) Inventors: A. Richard Sinclair, Houston, TX (US); Patrick R. Okell, Bellaire, TX (US); Syed Akbar, Houston, TX (US)

(73) Assignee: Fairmount Minerals, Inc., Chardon, OH (US)

(*) Notice: Subject to any disclaimer, the term of this patent is extended or adjusted under 35 U.S.C. 154(b) by 98 days.

(21) Appl. No.: 11/541,874

(22) Filed: Oct. 2, 2006

(65) Prior Publication Data
US 2008/0078547 A1 Apr. 3, 2008

(51) Int. Cl.
*E21B 43/267* (2006.01)

(52) U.S. Cl. ............. 166/280.2; 166/278; 166/283; 166/308.3; 428/403

(58) Field of Classification Search ........... None
See application file for complete search history.

(56) References Cited

U.S. PATENT DOCUMENTS

| | | | |
|---|---|---|---|
| 4,888,240 A | 12/1989 | Graham et al. | |
| 5,422,183 A | 6/1995 | Sinclair et al. | |
| 5,520,250 A | 5/1996 | Harry et al. | |
| 5,597,784 A | 1/1997 | Sinclair et al. | |
| 5,837,656 A | 11/1998 | Sinclair et al. | |
| 5,948,734 A | 9/1999 | Sinclair et al. | |
| 5,955,144 A | 9/1999 | Sinclair et al. | |
| 5,990,051 A | 11/1999 | Ischy et al. | |
| 6,114,410 A | 9/2000 | Betzold | |
| 6,279,656 B1 | 8/2001 | Sinclair et al. | |
| 6,328,105 B1 | 12/2001 | Betzold | |
| 6,372,678 B1 | 4/2002 | Youngman et al. | |
| 6,380,138 B1 | 4/2002 | Ischy et al. | |
| 6,528,157 B1 | 3/2003 | Hussain et al. | |
| 2002/0058581 A1 | 5/2002 | Youngman et al. | |
| 2005/0019574 A1* | 1/2005 | McCrary | 428/403 |
| 2005/0194141 A1 | 9/2005 | Sinclair et al. | |
| 2006/0035790 A1 | 2/2006 | Okell et al. | |
| 2006/0100342 A1 | 5/2006 | Jensen | |
| 2006/0175059 A1 | 8/2006 | Sinclair et al. | |
| 2006/0177661 A1* | 8/2006 | Smith et al. | 428/403 |

FOREIGN PATENT DOCUMENTS

| | | |
|---|---|---|
| EP | 562879 | 9/1993 |
| WO | WO 02/26656 | 4/2002 |
| WO | WO 2004/022853 | 3/2004 |
| WO | WO 2005/003514 | 1/2005 |
| WO | WO 2006/023172 | 3/2006 |

OTHER PUBLICATIONS

One page printout from http://www.glossary.oilfield.slb.com/DisplayImage.cfm?ID=506 dated Sep. 8, 2006, Schlumberger, Gravel pack.

* cited by examiner

*Primary Examiner*—Zakiya W. Bates
(74) *Attorney, Agent, or Firm*—Calfee, Halter & Griswold LLP

(57) ABSTRACT

A new proppant comprises a proppant particle substrate, a water-soluble external coating on the proppant particle substrate and a microparticulate reinforcing and spacing agent at least partially embedded in the water-soluble external coating in a manner such that the microparticulate reinforcing agent is substantially released from the proppant particle substrate when the water-soluble coating dissolves or degrades.

18 Claims, 2 Drawing Sheets

PROPPANTS WITH SOLUBLE COMPOSITE COATINGS

BACKGROUND AND SUMMARY

Commonly assigned U.S. Pat. No. 5,422,183 describes proppants in which a microparticulate reinforcing agent is provided in the boundary region between inner and outer resin coatings. This is done by adding the reinforcing agent after the inner resin coating is applied but before it is cured, whereby the reinforcing agent becomes dispersed on and in the uncured inner resin coating. The inner resin coating is then cured, followed by addition of the outer resin coating which is also cured. The reinforcing agent enhances bonding of the inner and outer resin coatings to one another and, in addition, increases the overall strength and durability of the product proppant obtained.

In accordance with this invention, a microparticulate reinforcing agent is provided in a water-soluble external coating on a particulate proppant substrate. As a result, not only is the overall strength and durability of the inventive proppant increased, but in addition the permeability of a proppant pack formed from the inventive proppant is also enhanced. In the same way, other techniques for using a particulate material to improve the operation and/or productivity of a well in a subterranean formation can also be enhanced by this invention.

Accordingly, this invention provides a new particulate material for improving the operation and/or productivity of a well in a subterranean formation, the new particulate material comprising a subterranean particle substrate, a water-soluble external coating on the subterranean particle substrate and a microparticulate reinforcing agent at least partially embedded in the water-soluble external coating in a manner such that the microparticulate reinforcing agent is substantially released from the subterranean particle substrate when the water-soluble coating dissolves or degrades.

In addition, this invention also provides a new method for enhancing the operation and/or productivity of a well in a subterranean formation comprising introducing this new particulate material into one or more of this subterranean formation, the wellbore in this formation or the well in this formation.

BRIEF DESCRIPTION OF THE DRAWINGS

This invention may be more readily understood by reference to the drawings wherein.

DETAILED DESCRIPTION

In accordance with this invention, a particulate proppant substrate is provided with a water soluble outer coating which also carries a microparticulate reinforcing agent. When a proppant pack formed from such a proppant is exposed to a flowing aqueous fluid, the portion of the water-soluble coating in the channels and interstices between contiguous proppant particles readily dissolves due to the greater flow of aqueous fluid in these areas. The result is that the water-soluble coating in these areas, including the entrained reinforcing agent microparticles, is released from these areas and discharged through the pack into the wellbore. This, in turn, enlarges intragranular pore spaces, which causes the permeability of the pack to be increased. Just as importantly, in the contact regions of contiguous proppant particles, i.e., at or near the locations where they contact one another, flow of aqueous fluid is small or nonexistent. The result is that the water-soluble coating in these contact regions, including the entrained reinforcing agent microparticles in these regions, is retained in place. This, in turn, increases the overall strength and durability of the proppant particles obtained, since the reinforcing agent microparticles remain in place at these contact regions to cushion and otherwise support contiguous proppant particles with respect to one another.

Figure 1:
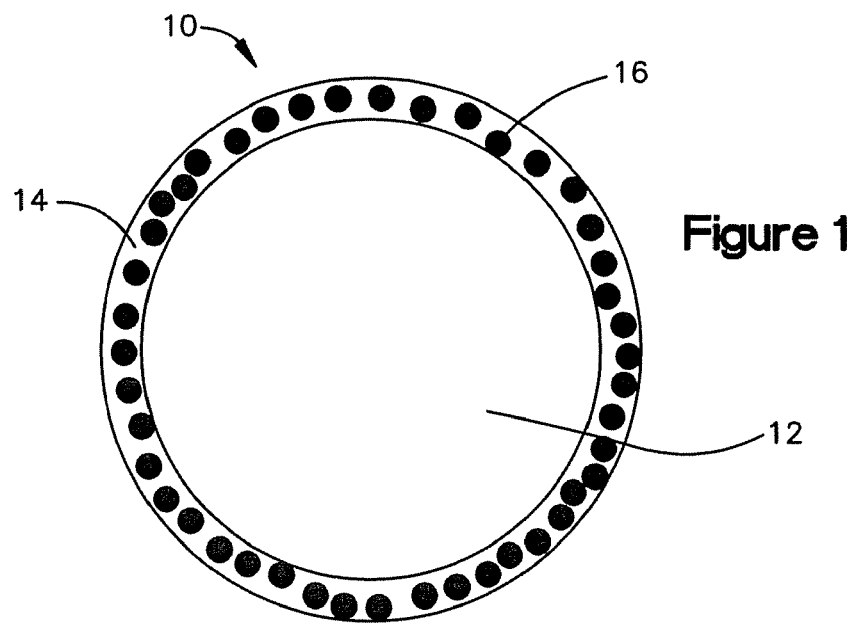
FIG. 1 schematically illustrates an individual proppant particle made in accordance with this invention.

This is illustrated in the drawings in which FIG. 1 shows a product proppant of this invention, which is generally indicated at 10, being composed of proppant particle substrate 12, water-soluble coating 14 and multiple reinforcing agent microparticles 16 embedded in the water soluble coating.

Figure 2:
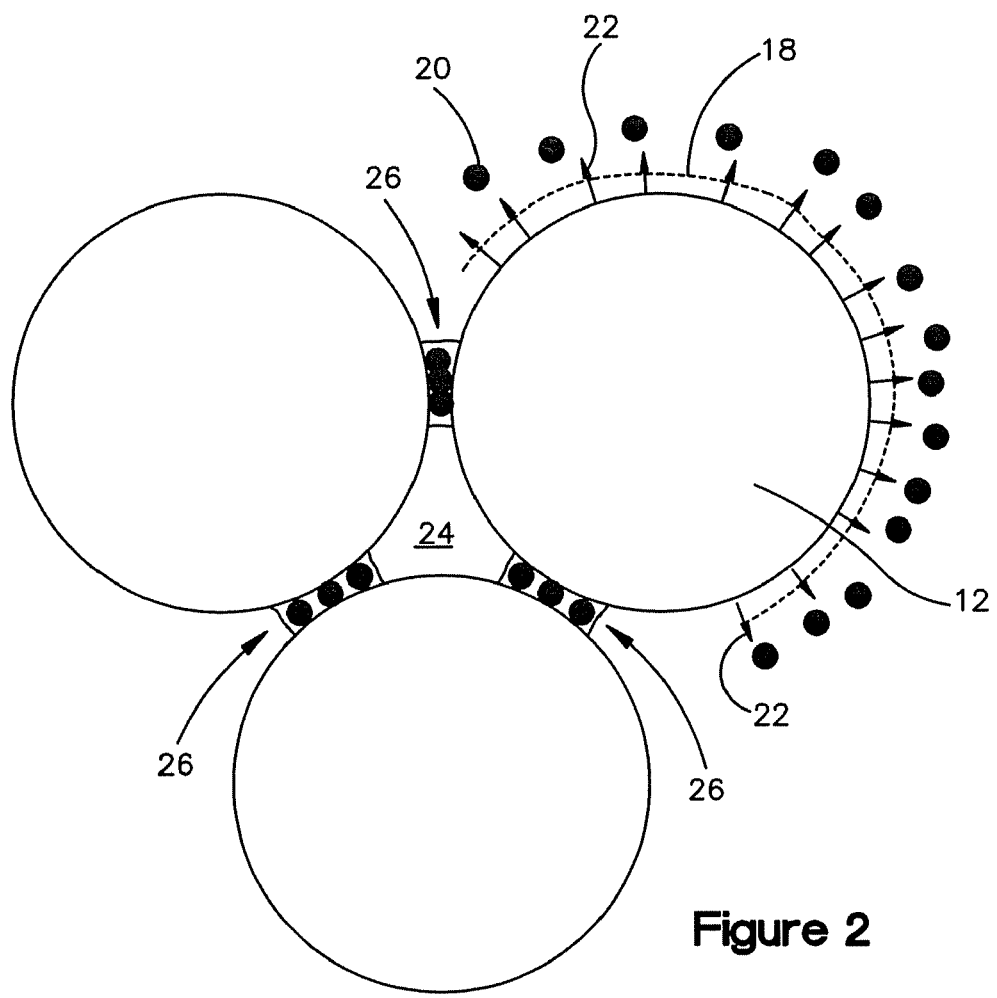
FIG. 2 schematically illustrates a proppant pack formed downhole from the proppant of FIG. 1.

When a proppant pack formed downhole from such a proppant is contacted with an aqueous formation fluid, as illustrated in FIG. 2, portions 18 of the water soluble coating 14 remote from the contact regions of contiguous particles dissolve in the fluid. In addition, reinforcing agent microparticles 20 in these portions of the water-soluble coating are also released, as illustrated by arrows 22. As the aqueous formation fluid continues to flow through the pack, both of these materials, i.e., portions 18 of the water-soluble coating as well as reinforcing agent microparticles 20 in these portions, are discharged from the pack. The net result is that the channels and interstices 24 between contiguous proppant particles are enlarged which, in turn, causes the overall permeability of the proppant pack to be increased.

In the contact regions between contiguous proppant particles, which are generally indicated at 26 in FIG. 2, the flow of aqueous formation fluid is very low or non-existent. As a result, the portions of water soluble coating 14 in these regions dissolve very slowly if at all. For this reason, and because of the mechanical stress placed by contiguous proppant particles 12 on microparticles 28 in these regions, these reinforcing agent microparticles remain in place. As a result, the overall strength and durability of the proppant pack is enhanced because of the cushioning and spacing effect provided by these microparticles in these regions.

Figure 3:
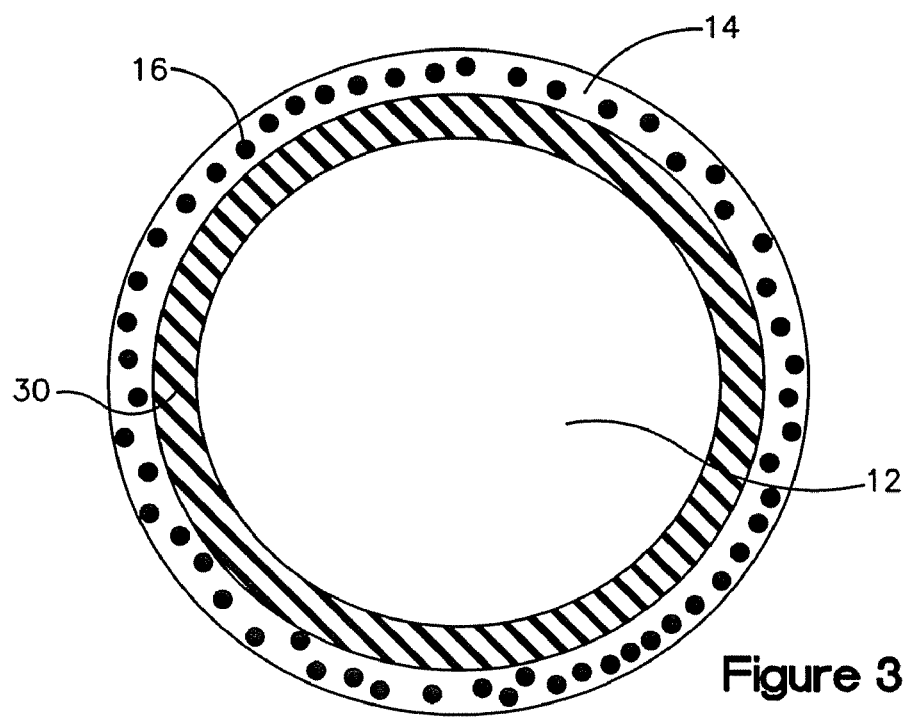
FIG. 3 schematically illustrates another modified proppant particle of this invention which includes a water-insoluble inner coating.
Figure 4:
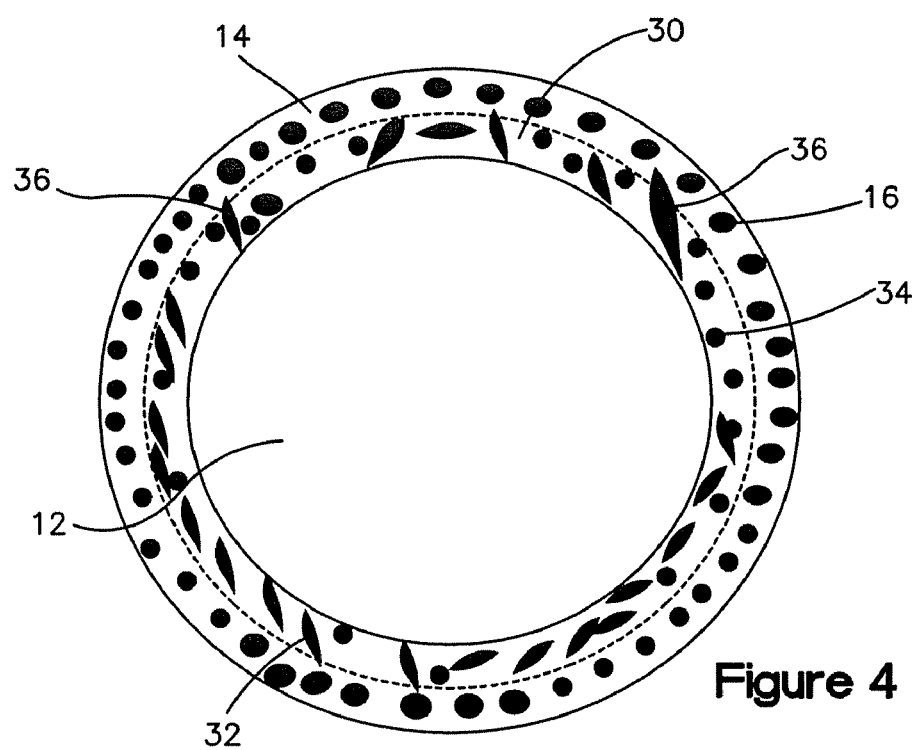
FIG. 4 schematically illustrates still another modified proppant particle of this invention which includes a water-insoluble inner coating including one or more reinforcing agents.

Additional embodiments of this invention are illustrated in FIGS. 3 and 4. In the embodiment of FIG. 3, inner water-insoluble coating 30 is provided between proppant particle 12 and water-soluble coating 14. In the embodiment of FIG. 4, water-insoluble coating 30 includes microparticulate reinforcing agent 32. In the particular embodiment shown, microparticulate reinforcing agent 32 is composed of microspheres 34 as well as microfibers or microplatelets 36. As further discussed below, water-insoluble coating 30 and optional microparticulate reinforcing agent 32 can be formed from known materials to provide known benefits.

Proppant Particle Substrate

The inventive proppant can be formed from any proppant particle substrate now or hereinafter known to function as a proppant in hydraulic fracturing. These materials are well known and described in numerous prior patents and publications, examples of which include U.S. Pat. No. 5,422,183, European Patent Application 0 562 879 A2, U.S. Pat. No.

6,114,410, U.S. Pat. No. 6,528,157, International Patent Application WO 2005/003514 A1, U.S. Published Patent Application No. 2005/0194141 and U.S. Published Patent Application No. 2006/0175059. The disclosures of each of these documents is incorporated herein by reference.

Proppant particle substrates of particular interest include conventional frac sand (silica), man made ceramics such as sintered bauxite, aluminum oxide and zirconium oxide, synthetic proppants (i.e. proppants made from synthetic resins) and metallic proppants. Naturally occurring proppants made from nut shells and fruit pits, for example, are also of interest.

Generally speaking, the proppant particle substrate will have a particle size of about 6 to 200 mesh, which corresponds to 3350 to 160μ. Particle sizes of about 12 to 100 mesh (1700 to 159μ) are more interesting, while particle sizes of about 20 to 40 mesh (850 to 425μ) are even more interesting.

Water-Soluble Coating

The inventive proppant can be formed from any water-soluble coating now or hereinafter known to function as a water-soluble coating for proppants used in hydraulic fracturing. These materials are well known and thoroughly described, for example, in the above-noted documents, particularly in European Patent Application 0 562 879 A2, U.S. Pat. No. 6,114,410, International Patent Application WO 2005/003514 A1, U.S. Published Patent Application No. 2005/0194141 and U.S. Published Patent Application No. 2006/0175059.

In general, these materials can be described as any natural or synthetic material which is capable of forming a continuous coating, which will not dissolve under ambient surface conditions, but which will dissolve or at least degrade when in contact with a water-based fluid in a subterranean environment in a manner such that the microparticulate reinforcing agent carried by the coating is substantially released. In this context, "substantial release" of the microparticulate reinforcing agent means that at least 50% of the microparticulate reinforcing agent will detach from the proppant after soaking in water maintained at the temperature of the subterranean environment of interest for 24 hours.

The inventive proppants like other proppants are transported from the surface to a subterranean use location by a "carrier fluid" where they form up into a proppant pack which is normally exposed to one or more "formation fluids." Where the inventive proppants are to be transported by a water-based carrier fluid, the water solubility of water-soluble coating should be sufficiently limited so that it will not substantially dissolve or degrade until the inventive proppant is delivered to the desired use location and formed up into a proppant pack (hereinafter "slowly water soluble"). Where organic-based carrier fluids are used, the water solubility of water-soluble coating can be greater.

Examples of materials which will form water soluble coatings include various types of collagen and other animal proteins, both uncrosslinked and crosslinked, polyethylene oxide, polypropylene oxide, polycaprolactones, graft copolymers of polyethylene oxide, polypropylene oxide and/or polycaprolactones, water reducible acrylics including acrylics derived from latexes, water reducible phenoxy resins, polyesters, polyvinyl alcohols, polyvinyl acetates, graft copolymers of polyvinyl alcohols and polyvinyl acetates, polylactides, polyglycolic acid, polyglycoliclacitc acid, wheat and other vegetable polymers, inorganic salts coated and/or bonded with these and other water soluble polymers, other low molecular weight proteins, etc. As well appreciated by those skilled in the art, the water solubility of such materials (both in terms of the rate as well as the degree of polymer dissolution) can be controlled through mixing, grafting and copolymerization, as well as variations in molecular weight and cross-linking.

In this connection, Example 2 of U.S. Published Patent Application No. 2006/0175059 describes an analytical test for determining the water solubility of various materials that can be used to form water-soluble coatings on proppants. This analytical test can be used to advantage here for selecting the particular water-soluble coatings to use in particular applications of this invention. In this analytical test, a test proppant comprising a mass of proppant particle substrates coated with the material to be tested is heated in a beaker of water at a particular time and temperature. The polymer removed from the test proppant at these conditions is captured on a piece of filter paper and the amount of polymer removed determined by comparing the weight of the filter paper before and after the test. Comparison of the amount of polymer removed with the amount of polymer on the test proppant initially gives an indication of the water-solubility of the material tested at the particular conditions of the test. Repeating this test at different times and temperatures generates a time/temperature profile of the material in terms of the rate it dissolves at different temperature conditions. This time/temperature profile can then be used to match the particular water-soluble resin selected to the subterranean formation to be processed and the particular fracing equipment to be used.

As indicated above, slowly water soluble materials are desirably used to make inventive proppants intended to be delivered with a water-based carrier fluid. For this purpose it is desirable that, when subjected to the above analytical test, no more than 5% of the material dissolves when heated for 5 hrs. at 80° F. (26.7° C.), while no more than 40% of the material dissolves when heated for 4 hrs. at 150° F. (65.6° C.). Materials with water solubilities such that no more than 10% of the material dissolves when heated for 5 hrs. at 80° F. (26.7° C.), while no more than 30% of the material dissolves when heated for 4 hrs. at 150° F. (65.6° C.) are more desirable.

The amount of water soluble coating to be used can vary widely and essentially any amount can be used. Normally, this amount will be sufficient to provide a water soluble coating about 1 to 60μ thick, more typically about 5-20μ thick or even 6-15μ thick.

Microparticulate Reinforcing Agent

The microparticulate reinforcing agents that can be used to make the inventive proppants are also well known and described, for example, in the above-noted documents, particularly in U.S. Pat. No. 5,422,183, U.S. Pat. No. 6,528,157 and U.S. Published Patent Application No. 2005/0194141.

In general, they can be described as any insoluble particulate material which is small in relation to the proppant particle substrate on which they are carried. In this context, "insoluble" means that they will not substantially dissolve when contacted with the carrier and formation fluids that will be encountered in use. Particular examples of materials from which the microparticulate reinforcing agents can be made include various mineral fillers such as filmed silica, silica flour, talc, clays, mica, asbestos, calcium carbonate, calcium sulfate, metals and wollastanite. Also included are all types of ceramic particles and microspheres.

Normally, the microparticulate reinforcing agent will have a particle size which is 25% or less of the particle size of the proppant particle substrate on which it is carried. More typically, the microparticulate reinforcing agent will have a particle size which is 10% or less or even 5% or less of the particle size of the proppant particle substrate.

These microparticulate reinforcing agents can have any shape including spherical, toroidal, platelets, shavings, flakes, ribbons, rods, strips, etc. Microparticulate reinforcing agents having a generally uniform shape (i.e. aspect ratio of 2 or less) will generally have a particle size of about 300 mesh or finer (approximately 40μ or finer). Microparticulate reinforcing agents of this type having particle sizes on the order of 20-40 mesh (1 to 25μ) are particularly interesting. Elongated microparticulate reinforcing agents (i.e. aspect ratio of more than 2) will generally have a length of about 150μ or finer, more typically about 100μ or finer or even 50μ or finer.

As indicated above, the thickness of the water-soluble coating of the inventive proppant particle can be as little as 3μ. This may be significantly less than the particle size of the microparticulate reinforcing agent being used, which means that these reinforcing agent microparticles may not be completely embedded in the water-soluble coating as illustrated in FIGS. 1-4. Rather in some instances, remote portions of these reinforcing agent microparticles may not be embedded in the water-soluble coatings at all. In other instances, the thickness of the water-soluble coating may vary significantly from location to location to accommodate reinforcing agent microparticles of different thicknesses. All of these variants are possible according to the present invention, so long as enough water-soluble coating is used to substantially bind the microparticulate reinforcing agent to the proppant particle substrate, i.e., so long as a substantial amount of the reinforcing agent microparticles remain bound to the product proppant particles until they are delivered to the desired downhole location and form up into a proppant pack.

The amount of microparticulate reinforcing agent that can be used in making the inventive proppant can vary widely and essentially any amount can be used. From a practical standpoint, enough microparticulate reinforcing agent should be used to provide a noticeable increase in the crush strength of a proppant pack formed from these proppants but no so much that no additional (i.e., marginal) benefit is realized. Normally, this means that the microparticulate reinforcing agents will be present in amounts of about 1 to 50%, more typically about 5 to 45 wt. %, based on the total weight of the water-soluble coating and microparticulate reinforcing agent combination.

Water-Insoluble Coating

In the embodiments illustrated in FIGS. 3 and 4, water insoluble coating 30 is provided between the outer surfaces of proppant particle substrate 12 and water-soluble coating 14.

Water insoluble coating 30 can be made from any water-insoluble material now or hereinafter known to be useful in providing water-insoluble coatings on proppants used in hydraulic fracturing. Such materials are well known and extensively described in the above-noted patents and publications. They can be used in this invention for the same purposes as described there. Optional ingredients such as cross-linking agents, plasticizers, elastomers, surfactants and the like can also be included.

Water-insoluble coatings of particular interest include the include phenol-aldehyde resins of both the resole and novolac type, urea-aldehyde resins, melamine-aldehyde resins, epoxy resins and furfuryl alcohol resins and copolymers of such resins.

Such water-insoluble resins may be uncured, partially cured or fully cured and may include one or more reinforcing agents of the same type as described above in connection with the water-insoluble resin coatings.

In general, these water-insoluble coatings will have generally the same thicknesses as the water-soluble coatings described above, namely about 3-60μ thick, more typically about 5-20μ thick or even 6-15μ thick.

Manufacture

The inventive proppants can conveniently be made by combining the microparticulate reinforcing agent with the water-soluble coating before it is applied and then coating the mixture so formed onto the proppant particle substrate in a conventional manner such as illustrated, for example, in the above-noted U.S. Pat. No. 5,422,183 and U.S. Published Patent Application No. 2005/0194141. Any other technique can also be employed which also provides sufficient microparticulate reinforcing agent in the water-soluble coating in a manner such that a substantial amount of this microparticulate reinforcing agent releases from the proppant particle substrate when the water-soluble coating dissolves or degrades.

Other Well-Treating Processes

Although this invention has been described above with particular reference to proppants useful in hydraulic fracturing, it is also applicable to all other well-treating techniques in which the operation, productivity and/or other performance characteristic of a well in a subterranean formation is enhanced by introducing a particulate material into the subterranean formation, a wellbore in this subterranean formation or a well in this subterranean formation. Specific examples include diverting well treatments with a diverting agent, gravel packing with a gravel pack particulate, frac packs, acidizing treatments, solvent treatments and the like.

In this case, the particulate material normally used for these processes (the "subterranean particle substrate") can be provided with a water soluble outer coating carrying a microparticulate reinforcing agent in the same manner as described above in connection with the inventive proppant.

Use

The inventive particulate materials are used in the same way as the conventional particulate materials they are intended to replace. For example, the inventive proppants are used in the same was as the proppants described in the above-noted patents and published applications by hydraulically charging a mass of the proppants downhole by means of a carrier fluid until they reach a desired location and then allowing the proppant mass to compact into a proppant pack for propping open fissures, channels and other pore spaces found or produced there. In the same way, diverting agents, gravel packs and other types of particulate materials made in accordance with this invention are used in the same way as the conventional particulates they are intended to replace, which techniques are well known in the art.

WORKING EXAMPLES

In order to more thoroughly describe the present invention, the following working examples are presented:

In these examples, the permeabilities and conductivities of three different proppant packs were determined according to a particular Laboratory Test, i.e., API RP61. In each test, proppant was loaded into a test cell in the amount of 2 pounds proppant per square foot of test cell. The test cell was then closed and a compressive stress applied to achieve different closure pressures. Brine was then passed through the test cell for 50 hours at each closure pressure, and the permeability and the conductivity of the proppant at each of these closure pressures was then measured. The results are reported in Table 1 below in which permeabilities are expressed in Darcy (D) and conductivities are expressed in millidarcy-feet (md-ft).

Three different proppants were tested. Comparative Proppant A was composed of 20/40 Bauxite Proppant particles coated with 3 wt % of a fully cured resin based on the total weight of the proppant particles and resin combined.

Comparative Proppant B was the same as Comparative Proppant A, except that the fully-cured resin coating was overcoated with a water soluble resin in an amount of 1% by weight, based on the total weight of the proppant particles including all coatings.

Proppant 1, which was made in accordance with this invention, was the same as Comparative Proppant B, except that the outermost coating was composed of 50 wt. % water-soluble resin and 50 wt. % microparticles, these percents being based on the outermost coating only.

The following results were obtained:

TABLE 1

Permeabilities and Conductivities of Proppant Packs Made with Selected Proppants

| Closure Stress (psi) | Comp. Proppant A | | Comp. Proppant B | | Proppant 1 | |
|---|---|---|---|---|---|---|
| | Perm | Cond | Perm | Cond | Perm | Cond |
| 2,000 | 398 | 7645 | 400 | 8250 | 428 | 8411 |
| 4,000 | 355 | 5989 | 368 | 6007 | 401 | 6240 |
| 6,000 | 305 | 4788 | 338 | 4855 | 389 | 5100 |
| 8,000 | 264 | 3860 | 277 | 3965 | 340 | 4349 |
| 10,000 | 212 | 2581 | 228 | 2821 | 286 | 3100 |
| 12,000 | 165 | 2287 | 176 | 2290 | 264 | 2820 |
| 14,000 | 141 | 1437 | 155 | 1540 | 194 | 1732 |

From Table 1, it can be seen that Proppant 1 exhibited enhanced permeability and conductivity at all closure pressures, thereby demonstrating the beneficial effect achieved by including microparticles in its outermost water-soluble coating.

Although only a few embodiments have been described above, its should be appreciated that many modifications can be made without departing from the spirit and scope of the invention. All such modifications are intended to be included within the scope of the present invention, which is to be limited only by the following claims.

The invention claimed is:

1. A proppant comprising a proppant particle substrate, a water-soluble external coating on the proppant particle substrate and an insoluble microparticulate reinforcing and spacing agent at least partially embedded in the water-soluble external coating in a manner such that the microparticulate reinforcing and spacing agent is substantially released from the proppant particle substrate when the water-soluble coating dissolves or degrades.

2. The particulate material of claim 1, wherein the particle size of the microparticulate reinforcing agent is 25% or less of particle size of the proppant particle substrate.

3. The particulate material of claim 2, wherein the particle size of the proppant particle substrate is 6 to 140 mesh.

4. The particulate material of claim 3, wherein the particle size of the proppant particle substrate is about 20 to 100 mesh.

5. The particulate material of claim 3, wherein the aspect ratio of the reinforcing agent is 2 or less and further wherein the particle size of the reinforcing agent is about 300 mesh or finer.

6. The particulate material of claim 3, wherein the aspect ratio of the reinforcing agent is greater than 2 and further wherein the length of the reinforcing agent about 100μ or finer.

7. The particulate material of claim 1, wherein the water-soluble resin is made from polyethylene oxide, polypropylene oxide, polycaprolactones, graft copolymers of polyethylene oxide, polypropylene oxide and/or polycaprolactones, water reducible acrylics, water reducible phenoxy resins, polyesters, polyvinyl alcohols, polyvinyl acetates, graft copolymers of polyvinyl alcohols and polyvinyl acetates, polylactides, polyglycolic acid, polyglycoliclacitc acid, vegetable polymers, collagen, other animal proteins, inorganic salts coated with these water soluble polymers, other low molecular weight proteins or mixtures thereof.

8. The particulate material of claim 7, wherein the proppant particle substrate is made from silica, sintered bauxite, sintered aluminum oxide, sintered zirconium oxide, a synthetic resin, a metal or mixtures thereof, and further wherein the microparticulate reinforcing agent is made from a mineral filler, silica flour, talc, clays, mica, asbestos, calcium carbonate, calcium sulfate, metals, wollastanite, ceramic microspheres or mixtures thereof.

9. The particulate material of claim 8, further comprising a water-insoluble coating between the particulate proppant substrate and the water-soluble coating.

10. The particulate material of claim 9, further comprising a microparticulate reinforcing and spacing agent in the water-insoluble coating.

11. A particulate material for enhancing the operation and/or productivity of a well in a subterranean formation comprising a subterranean particle substrate, a water-soluble external coating on the subterranean particle substrate and a microparticulate reinforcing agent at least partially embedded in the water-soluble external coating in a manner such that the microparticulate reinforcing agent is substantially released from the subterranean particle substrate when the water-soluble coating dissolves or degrades.

12. The particulate material of claim 11, wherein the particulate material is a diverting agent, frac pack or a gravel pack particulate.

13. A method for enhancing the performance of a well in a subterranean formation comprising introducing the particulate material of claim 11 into one or more of the subterranean formation, a wellbore in this subterranean formation or a well in this subterranean formation.

14. The method of claim 13, wherein the particulate material is a proppant comprising a proppant particle substrate, a water-soluble external coating on the proppant particle substrate and a microparticulate reinforcing agent at least partially embedded in the water-soluble external coating in a manner such that the microparticulate reinforcing agent is substantially released from the proppant particle substrate when the water-soluble coating dissolves.

15. The method of claim 14, wherein the particle size of the microparticulate reinforcing agent is 25% or less of particle size of the proppant particle substrate.

16. The method of claim 15, wherein the particle size of the proppant particle substrate is 6 to 140 mesh.

17. The method of claim 16, wherein the particle size of the proppant particle substrate is about 20 to 100 mesh.

18. The method of claim 13, wherein the particulate material is a diverting agent, frac pack or a gravel pack particulate.

* * * * *